(12) United States Patent
Rajasekharan Unnithan et al.

(10) Patent No.: US 12,135,446 B2
(45) Date of Patent: Nov. 5, 2024

(54) LIGHT GUIDING APPARATUS AND GUIDING METHOD THEREOF

(71) Applicant: KDH ADVANCED RESEARCH PTY LTD, Balwyn North (AU)

(72) Inventors: Ranjith Rajasekharan Unnithan, Melbourne (AU); Wei-Young Liang, Taipei (TW); Chung-Hsien Lu, British Virgin Island (GB); Christina Lim, Melbourne (AU)

(73) Assignee: KDH Advanced Research Pty Ltd., Balwyn North (AU)

( * ) Notice: Subject to any disclaimer, the term of this patent is extended or adjusted under 35 U.S.C. 154(b) by 126 days.

(21) Appl. No.: 17/757,028

(22) PCT Filed: Dec. 9, 2020

(86) PCT No.: PCT/AU2020/051347
§ 371 (c)(1),
(2) Date: Jun. 8, 2022

(87) PCT Pub. No.: WO2021/113911
PCT Pub. Date: Jun. 17, 2021

(65) Prior Publication Data
US 2023/0023734 A1    Jan. 26, 2023

Related U.S. Application Data

(63) Continuation of application No. 16/858,724, filed on Apr. 27, 2020, now Pat. No. 11,221,439, and a
(Continued)

(30) Foreign Application Priority Data

Sep. 7, 2020   (AU) .............................. 2020903198

(51) Int. Cl.
*F21V 8/00* (2006.01)
*G02B 6/06* (2006.01)
(Continued)

(52) U.S. Cl.
CPC ......... *G02B 6/0006* (2013.01); *G02B 6/0008* (2013.01); *G02B 6/06* (2013.01);
(Continued)

(58) Field of Classification Search
CPC .. G02B 6/0006; G02B 6/0008; G02B 6/0011; G02B 6/0028; G02B 6/0031;
(Continued)

(56) References Cited

U.S. PATENT DOCUMENTS 4,306,765 A   12/1981   Winzer et al.
4,325,605 A    4/1982   Winzer et al.
(Continued)

OTHER PUBLICATIONS

International Search Report and Written Opinion mailed Jan. 29, 2021, in connection with International Patent Application No. PCT/AU2020/051347, filed Dec. 9, 2020, 12 pgs.
(Continued)

*Primary Examiner* — Ryan A Lepisto
(74) *Attorney, Agent, or Firm* — Joshua S. Matloff

(57) ABSTRACT

The present invention relates to a light guiding apparatus, comprising a light transmitting polymer guide having a first end, a second end extending from the first end, and a light path extending between the first end and the second end, and at least one light reflector disposed along the light path and at an angle relative to the light path. The present invention also relates to a method of fabricating the light guiding apparatus.

19 Claims, 12 Drawing Sheets

Related U.S. Application Data continuation of application No. 16/858,721, filed on Apr. 27, 2020, now Pat. No. 11,420,404, and a continuation of application No. 16/706,867, filed on Dec. 9, 2019, now abandoned.

(51) Int. Cl.

| | |
|---|---|
| *G02B 6/122* | (2006.01) |
| *G02B 6/125* | (2006.01) |
| *G02B 6/26* | (2006.01) |
| *G02B 6/42* | (2006.01) |
| *G02B 6/44* | (2006.01) |
| *G02B 27/01* | (2006.01) |
| *G02B 6/12* | (2006.01) |

(52) U.S. Cl.
CPC .............. *G02B 6/125* (2013.01); *G02B 6/26* (2013.01); *G02B 6/4214* (2013.01); *G02B 27/0172* (2013.01); *G02B 6/0011* (2013.01); *G02B 6/0028* (2013.01); *G02B 6/0031* (2013.01); *G02B 6/0055* (2013.01); *G02B 2006/12104* (2013.01); *G02B 6/1221* (2013.01); *G02B 6/443* (2013.01); *G02B 27/0101* (2013.01)

(58) Field of Classification Search
CPC ...... G02B 6/0055; G02B 6/06; G02B 6/1221; G02B 6/125; G02B 6/26; G02B 6/4214; G02B 6/443; G02B 27/0101; G02B 27/0172; G02B 2006/12104
See application file for complete search history.

(56) References Cited

U.S. PATENT DOCUMENTS

| | | |
|---|---|---|
| 4,398,791 A | 8/1983 | Dorsey |
| 4,439,005 A | 3/1984 | Winzer |
| 4,862,873 A | 9/1989 | Yajima et al. |
| 6,735,462 B2 | 5/2004 | Klocek et al. |
| 8,214,010 B2 | 7/2012 | Courtney et al. |
| 10,307,047 B2 | 6/2019 | Scheller et al. |
| 10,634,899 B2 | 4/2020 | Gopinath et al. |
| 11,947,162 B2 | 4/2024 | Liang et al. |
| 2003/0141096 A1 | 7/2003 | Saccomanno |
| 2004/0076394 A1 | 4/2004 | Carniel et al. |
| 2004/0234224 A1 | 11/2004 | Ishizaki et al. |
| 2006/0002108 A1 | 1/2006 | Ouderkirk et al. |
| 2007/0140615 A1 | 6/2007 | Tanaka et al. |
| 2007/0172171 A1 | 7/2007 | van Ostrand et al. |
| 2010/0074579 A1 | 3/2010 | Fujii et al. |
| 2014/0176862 A1 | 6/2014 | Uehara |
| 2015/0205126 A1* | 7/2015 | Schowengerdt ... G02B 27/0176 345/633 |
| 2016/0239092 A1 | 8/2016 | Junuzovic et al. |
| 2018/0329129 A1* | 11/2018 | Tjin .................. G02B 6/003 |
| 2020/0041720 A1 | 2/2020 | Morales et al. |
| 2020/0088944 A1 | 3/2020 | Sato et al. |

OTHER PUBLICATIONS

Search Report mailed Oct. 15, 2020, in connection with Australian Patent Application No. 2020903198, filed Sep. 7, 2020, 21 pgs.

\* cited by examiner

LIGHT GUIDING APPARATUS AND GUIDING METHOD THEREOF

CROSS-REFERENCE TO RELATED APPLICATIONS

This application is a national stage under 35 U.S.C. 371 of International Patent Application Serial No. PCT/AU2020/051347, filed Dec. 9, 2020, which claims priority to U.S. patent application Ser. No. 16/706,867, filed Dec. 9, 2019; U.S. patent application Ser. No. 16/858,721, filed Apr. 27, 2020; U.S. patent application Ser. No. 16/858,724, filed Apr. 27, 2020; and Australian Patent Application No. 2020903198, filed Sep. 7, 2020, the disclosures of all are incorporated herein by reference in their entirety.

TECHNICAL FIELD

The present invention relates, in general terms, to a light guiding apparatus for directing a light from a light source to an eye of a user. The present invention also relates to a guiding method thereof.

BACKGROUND

Augmented Reality (AR) is an emerging technology that enables the seamless overlay of the real world with computer generated virtual images in such a way that the virtual content is aligned with real world objects. The main part of any AR device is a display through which a viewer can see virtual content and real world objects at the same time. The virtual content can be overlaid over a physical object and in some cases can interact with the physical object. AR is now being targeted in a wide range of application domains, including education (interactive learning and teacher training), medicine (image guided surgery and surgical simulation), consumer products (head up displays for helmets and AR spectacles), industrial (architectural planning and object assembly), and entertainment (AR tourism and story telling).

Despite AR promising to provide breakthrough visual experience in numerous applications, it has failed to receive widespread adoption due to discomfort, eyestrain and cumbersome devices. These drawbacks are threatening growth in this market that has the potential to grow to US$100 billion by 2024.

A traditional projection imaging method projects the light beam to the image-receiving object through air as a medium. The advantage of this method is high brightness of the light beam arriving at the image-receiving object and low consumption of light energy. However, this method allows the light beam to travel only in a straight line, which limits the installation flexibility of a light source in a space-limited apparatus. To make the light beam change the traveling direction, additional reflective structures can be placed on the light path to change the direction of the light path. However, the disposition of the additional reflective structures causes some problems such as higher manufacturing cost, production difficulties, complex design, and increased size. Another traditional projection imaging method guides the light beam through the grating or diffraction, not constrained by the straight movement, which however decreases the brightness of the light beam arriving at the image-receiving object and consumes more light energy. Consequently, the designs of the power supply and the heat dissipation mechanism become difficult. In addition, the interference may be caused as the light beams travels along the light path and creates difficulty in design and mass production regarding the optical grade carrier material and forming structures, unfavourable for the imaging and display quality.

The slow uptake of AR by the public is mainly caused by the physical form of current AR devices, which require the viewer to look through thick cube reflectors, a limited field of view and an eye box that limit movement of the eyes and obstructs peripheral vision. This glass-based display technology demands micro-display and coupling optics to be integrated to the viewing glass on either side of the eyes and that makes the system bulky around the eyes in addition to blocking the side view. These shortcomings are primarily responsible for limited uptake of current AR glass technology.

For example, light from a micro-display is coupled to glass. Since the glass based AR display cannot bend, this demands that the display and electronics always need to be near or around the viewing area such as our eyes. This results in a heavy and bulky viewing side, which prevents their wide usage. For example, when used in spectacles, this causes the spectacles to be 'front' heavy, which causes discomfort to the area around the nose bridge. Furthermore, viewing angle is limited in the conventional glass based technology and also efficiency of light coupling is very less which prevents seeing in bright light conditions.

The strive for compactness has led to several different complex optical solutions, all of which, on the one hand, are still not sufficiently compact for most practical applications, and, on the other hand, suffer major drawbacks in terms of manufacturability.

Another technology uses a curved partial reflector acting both as a magnifying optics and a combiner and this eliminates the need of additional magnifying optics. This technology is used in DreamGlass. However, the curved mirror distorts the see-through images from the real world.

Another technology uses a glass wafer of thickness around 5 mm as a waveguide to carry the light (image). However, this design sacrifices the field of view (FOV) due to the limited angular range. There is also a discontinuity in the image when the eyeball moves within the eye box due to the difficulty of integrating reflectors inside the glass with less than a few mm spacing.

Another AR display technology uses holograms or gratings to reflect the light into viewer's eyes. However, this emerging technology requires more research to make it working efficiently for all the visible wavelengths (colours). Hologram-based technique requires RGB lasers and complex image processing and hence large onboard computing power usage.

It would be desirable to overcome or ameliorate at least one of the above-described problems, or at least to provide a useful alternative.

SUMMARY

The present invention is predicated on the understanding that a AR display can be made flexible by taking into account the various refractive indexes and material properties of specific materials and determining the optimised internal reflection in order to transmit light from a light source to a user. To this end, it is envisioned that a thin film display fitted with light reflectors as reflective pixels that can reflect images to a user's eye and a flexible waveguide for guiding light from a light source can overcome at least some of the disadvantages. Advantageously, a light guiding apparatus which is flexible and/or curved can improve its installation in a space-limited apparatus as it allows for the image source to be positioned some distance away from a reflector or screen, the image source not in a line of sight to the reflector. Additionally, as each light reflector comprises an array of nanostructures and/or microstructures, with each nanostructures and/or microstructures defining an interface for reflective light, a transparent (or at least a translucent) light reflector is formed. To this end, a see-through effect from a lateral side of the waveguide to another lateral side can be obtained. At the same time the light beam arriving from the image-receiving object can have a high brightness with low consumption of light energy, enhanced field of view, sharpness and can reduce strain to the eyes. This invention can be incorporated as a component in near field applications such as a spectacle or on a helmet or far field applications such as car windscreen and windows. For example, because the electronics can be positioned at a distance away from the display, spectacles are 'end' heavy, and thus improve comfort for the user.

The present invention relates to a light guiding apparatus, comprising:
a) a flexible and/or curved light transmitting polymer guide having a light path extending between a first end and a second end; and
b) at least one light reflector disposed within the polymer guide at an angle relative to the light path;
wherein the at least one light reflector comprises an array of nanostructures and/or microstructures; and
wherein the array of nanostructures and/or microstructures is selected from a metal-polymer boundary, an air-polymer boundary, a material-polymer boundary, or a combination thereof, the material having a lower refractive index than the polymer guide.

Advantageously, the polymer guide allows an image source to be positioned at a distance away from the user's eyes. Further, the polymer guide allows the light path connecting the image source and light reflector to be in a curved or bent configuration such that the image source and light reflector are not in a line of sight, thereby increasing its adaptability in various augmented reality applications. The image guiding apparatus can carry an image while being bent without distortion and leakage of the image to reach the light reflector such that it is reflect into viewer's eyes while same time being transparent. The array of nanostructures and/or microstructures allows light to be reflected to a viewer's eye and at the same time allows for transparency.

In some embodiments, the light reflector is fully embedded within the polymer waveguide. In other embodiments, the light reflector is interposed within the polymer guide such that the polymer guide is in contact with both an anterior surface and posterior surface of the light reflector.

In some embodiments, the light reflector is disposed at an angle of about 5° to about 80° relative to the light path.

In some embodiments, each of the nanostructures and/or microstructures is disposed at an angle of about 5° to about 80° relative to the light path. Each nanostructure and/or microstructure in the array can have a same angle or different angles with respect to the light path.

In some embodiments, each of the nanostructures and/or microstructures independently has a thickness of about 4 nm to about 500 µm.

In some embodiments, each of the nanostructures and/or microstructures independently has a width of about 50 nm to about 1000 µm.

In some embodiments, each of the nanostructures and/or microstructures independently has a pitch of about 50 nm to about 500 µm.

In some embodiments, the light guiding apparatus comprises a plurality of light reflectors disposed within the polymer guide and arranged in series at an angle relative to the light path.

In some embodiments, the polymer guide has a refractive index of about 1.4 to about 1.6.

In some embodiments, the polymer guide has a transparency of more than 90%.

In some embodiments, the polymer guide has a flexural modulus of less than about 4 GPa.

In some embodiments, the polymer guide is made from a material selected from polydimethylsiloxane (PDMS), polycarbonate, polyester, acrylic such as poly(methyl methacrylate), their derivatives and combinations thereof.

Advantageously, it was found that the use of a flexible polymer can still impart a large viewing angle and high coupling efficiency to the light guiding apparatus.

In some embodiments, the polymer guide has a cross sectional thickness of about 1 µm to about 10 mm.

In some embodiments, the polymer guide has a cross sectional breadth of about 1 µm to about 30 mm.

The present invention also relates to an array of light guiding apparatus as disclosed herein.

In some embodiments, the respective light guiding apparatus in the array are each separated by a cladding layer.

In some embodiments, the respective light guiding apparatus in the array are each separated by a buffer layer.

In some embodiments, the respective light guiding apparatus in the array is collectively coated by a buffer layer.

In some embodiments, the light guiding apparatus or array further comprises a light source disposed adjacent to the first end of the polymer guide of the light guiding apparatus.

In some embodiments, the light guiding apparatus or array further comprises optical coupling means for coupling light from light source into the polymer guide of the light guiding apparatus.

The present invention also relates to a method of fabricating a light guiding apparatus, comprising:
a) forming a flexible and/or curved light transmitting polymer guide having a light path extending between a first end and a second end; and
b) disposing at least one light reflector within the polymer guide at an angle relative to the light path;
wherein the at least one light reflector comprises an array of nanostructures and/or microstructures; and
wherein the array of nanostructures and/or microstructures is selected from a metal-polymer boundary, an air-polymer boundary, a material-polymer boundary or a combination thereof, the material having a lower refractive index than the polymer guide.

The present invention also relates to a method of fabricating an array of light guiding apparatuses, comprising:
a) forming a first flexible and/or curved light transmitting polymer guide having a light path extending between a first end and a second end;
b) stacking a second flexible and/or curved light transmitting polymer guide next to the first light transmitting polymer guide; and
b) disposing at least one light reflector within the first and second polymer guide at an angle relative to the light path;
wherein the at least one light reflector comprises an array of nanostructures and/or microstructures; and
wherein the array of nanostructures and/or microstructures is selected from a metal-polymer boundary, an air-polymer boundary, a material-polymer boundary or a combination thereof, the material having a lower refractive index than the polymer guide.

BRIEF DESCRIPTION OF THE DRAWINGS

Embodiments of the present invention will now be described, by way of non-limiting example, with reference to the drawings in which.

DETAILED DESCRIPTION

Figure 1:
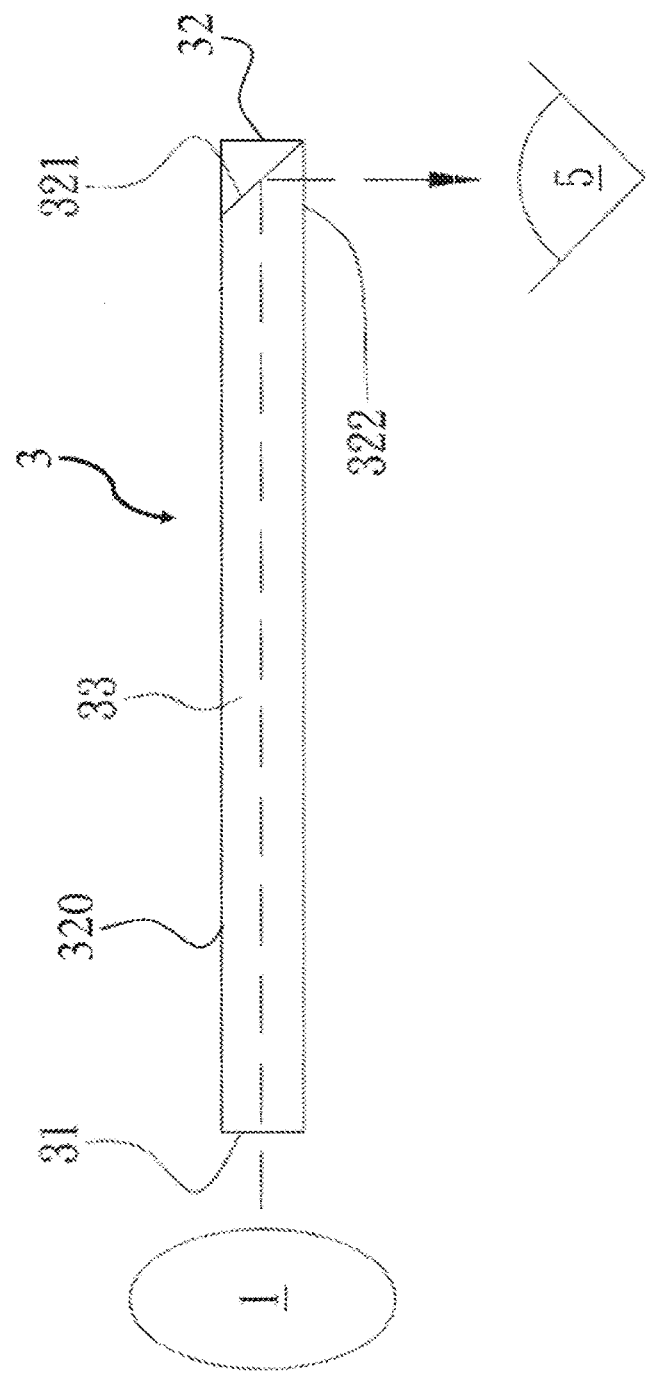
FIG. 1 is a side view of a light guiding apparatus according to an embodiment of the present invention.

FIG. 1 shows a side view of an exemplary light guiding apparatus 3 of the present invention. The light guiding apparatus 3 is suitable for transmitting light (as indicated by a dashed arrow) from a light source 1 to a user's eye 5. The light guiding apparatus 3 comprises a light transmitting polymer guide 320 having a first end 31, a second end 32 extending from the first end 31, and a light path 33 extending between the first end 31 and the second end 32. In this embodiment, the second end 32 extends outward from the first end 31; that is, the second end 32 extends from the first end 31, away from the light source 1. The light path 33 is disposed between the first end 31 and the second end 32.

The polymer guide 320 is capable of transmitting light. The transmittance of a material is the proportion of the incident light that moves all the way through to the other side; i.e. the effectiveness in transmitting light. The polymer guide is light transmitting in that it is capable of transmitting at least 90% of light from the light source, or at least 85%, at least 80%, at least 75%, at least 70%, at least 65% or at least 60%.

Alternatively, the polymer guide can have a transparency of more than about 90%. Transparency (or transmission of visible light) is characterized by light transmittance, i.e. the measured percentage of incident light transmitted through a material. The higher the transmittance, the higher the transparency. In other embodiments, the transparency is more than about 85%, about 80%, about 75%, about 70%, about 65% or about 60%.

The polymer guide 320 is capable of transmitting light in the visible light spectrum; i.e. wavelength of about 380 nm to 740 nm. To this end, the polymer guide 320 is capable of transmitting at least the primary colours (red, yellow, blue). The polymer guide 320 can be capable of transmitting monochromatic light (red, orange, yellow, green, cyan, blue, violet). The polymer guide 320 can be also capable of transmitting mixed colours, for example, pink and magenta.

The light guiding apparatus 3 comprises at least one light reflector 321. The light reflector 321 can be approximate to the second end 32. The light reflector 321 is disposed within the polymer guide. For example, the light reflector can be fully embedded within the polymer guide. Preferably, the light reflector is interposed within the polymer guide. To this end, the light reflector is inserted or placed between two sections of the polymer guide. The light reflector 321 is disposed at an angle relative to the light path 33. In this way, the light reflector 321 reflects the light towards a predetermined direction, where the user 5 is positioned. The second end 32 can be further surface treated by a coating 322 to form a light-leaving surface, but not limited to this.

Accordingly, the present invention relates to a light guiding apparatus, comprising:
 a) a flexible and/or curved light transmitting polymer guide having a light path extending between a first end and a second end; and
 b) at least one light reflector embedded within the polymer guide at an angle relative to the light path;
wherein the light reflector is selected from a metal-polymer boundary, an air-polymer boundary, a material-polymer boundary, or a combination thereof, the material having a lower refractive index than the polymer guide.

By disposing the light reflector within the polymer guide, or preferably interposed within the polymer guide, leakage of the transmitted light beam within the polymer guide is minimised. Further, extension of the polymer guide rearward from the light reflector, such that the polymer guide is in contact with an anterior surface and posterior surface of the light reflector, acts to direct stray light from interfering with the image received at the viewer's eye.

Figure 12:
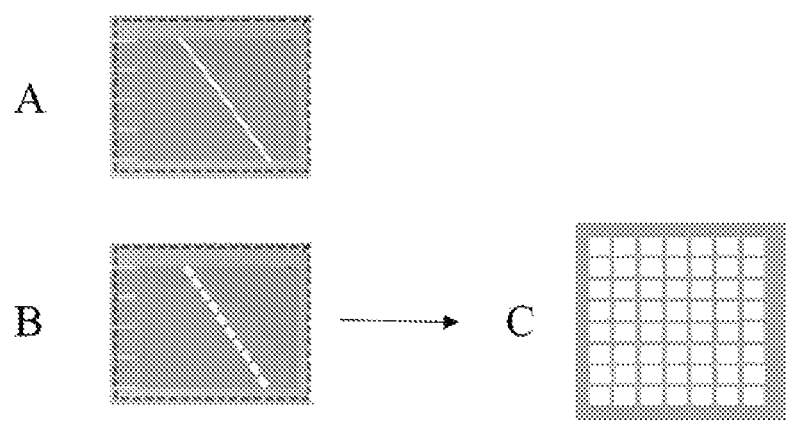
FIG. 12 shows various embodiments of the light reflectors.
Figure 13:
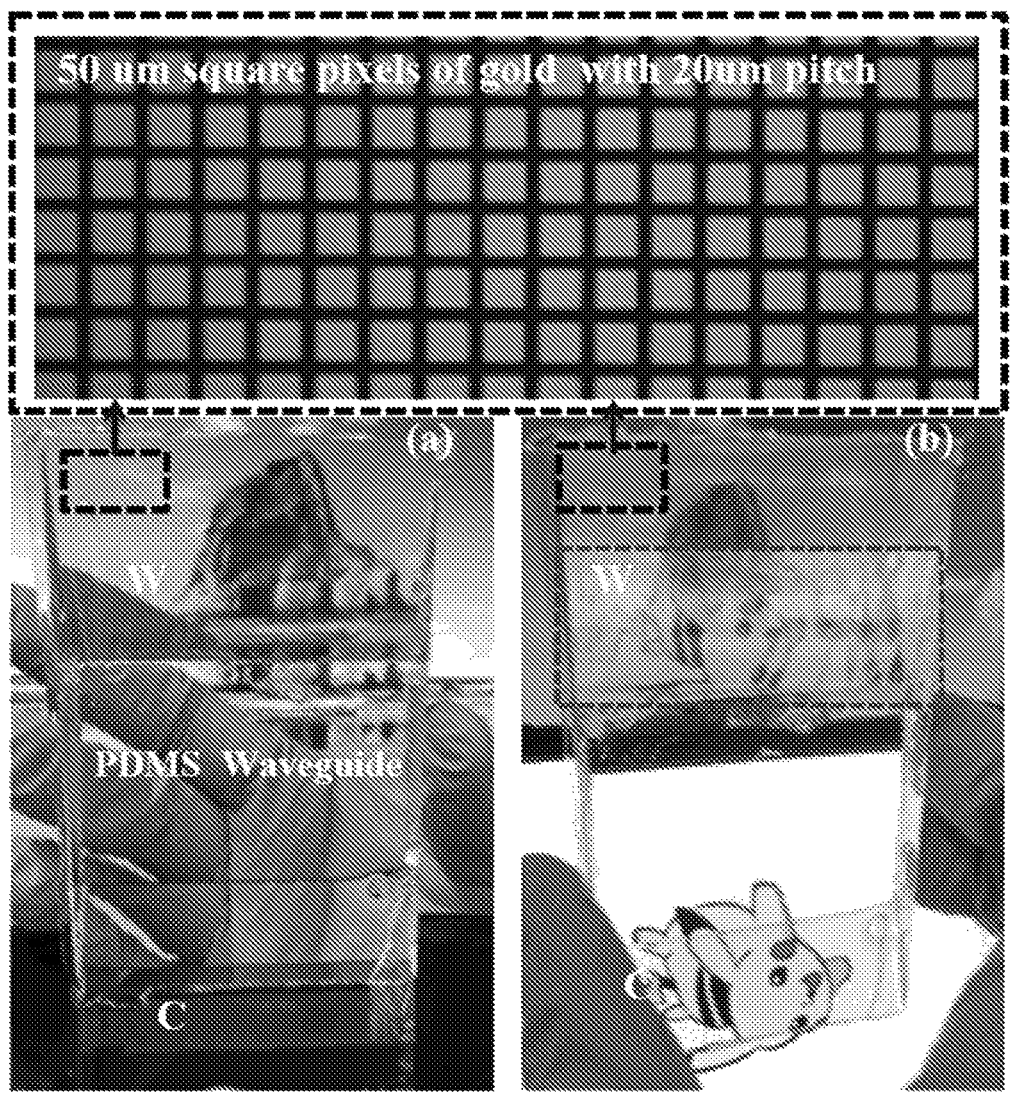
FIG. 13 shows an example of a light guiding apparatus.
Figure 14:
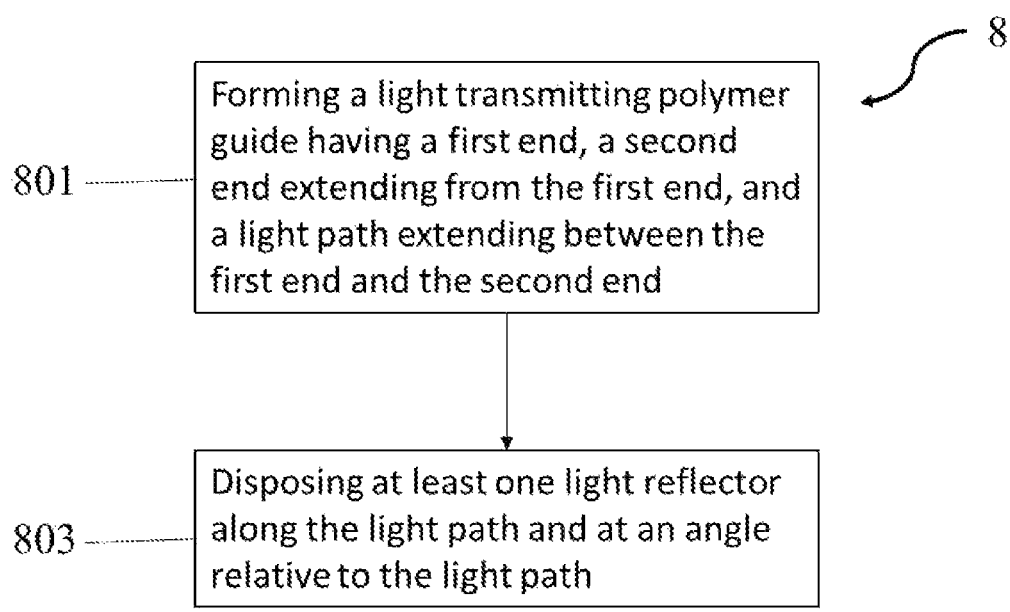
FIG. 14 is a flow chart of a method of fabricating the light guiding apparatus of the present invention.

The light reflector 321 can be a homogenous surface. More advantageously, the light reflector 321 can comprise an array of nanostructures and/or microstructures. For example, FIG. 12 shows a light reflector B and the array of nanostructures and/or microstructures C. FIG. 13 shows the array of nanostructures and/or microstructures as 50 μm square microstructures with 20 μm pitches.

As used herein, "array" refers to an arrangement of at least two entities.

It was found that this feature allows for transparency of the light reflector, which allows the light guiding apparatus to be used in augmented reality. In this sense, a virtual image can be reflected to a viewer's eye through reflection at the nanostructures and/or microstructures. The pitch or gaps within the array of structures allows light transmitting from the real world physical object to pass through, thus providing visibility. The viewer can thus see an overlap of the virtual image and the physical object even when the light guiding apparatus is positioned in front of the viewer's eye.

This is in contrast to the prior art, for example US 2004/0234224, US 2007/0140615 and US 2010/0074579, which are mainly focused in applications in fibre-optics communication and photonic circuits. In such applications, light of a certain wavelength is often used and thus there is no or little need for multiplexing light of various wavelength. Further, much prior focus has been placed on improving transmission of light or reduce noise; through the connection of the polymer guide with the light reflector, and/or the interface of the cladding layer and the light reflector or focusing the light at the light reflector. For example, a concaved light reflector had been suggested to focus the light or the cladding layer can be staggered relative to the light reflector to reduce noise to a detector. The present invention instead uses a light reflector comprising an array of structures, which inadvertently allows some of the transmission light to be lost through the gaps of the structures, in order to at least obtain the benefit of transparency for a viewer to see through the light guiding apparatus.

Additionally, the thickness, width and size of the nano-structures and/or microstructures can be varied to tune reflectivity and the light transmitted through from outside to enable see through.

Furthermore, as the transmitted light (dotted line in FIG. 1) may be not travelling directly to the light reflector but can also undergo multiple reflection off the sides of polymer guide 320, the size of the final image received at a user's eye 5 can be varied. This can, for example, be effected using an optics at the first end 31. In this way, a thin waveguide structure can be constructed.

Further, by multiplexing the light beam transmitting within the polymer guide, a relatively thin light guiding apparatus can be formed. This is in contrast to prior waveguides, in which light from a source is split into a plurality or array of waveguides instead of the light reflector being an array of structures as disclosed herein, with each waveguide independently transmitting light of a different wavelength to a light reflector. A problem with such a setup is that it tends to be bulky and is not suitable for installation in headgear for use in augmented reality.

When the light reflector 321 is formed as a homogenous surface, it can be selected from a metal-polymer boundary, an air-polymer boundary, a material-polymer boundary or a combination thereof. The boundary is formed from an interface of the polymer guide and a metal, air, material or a combination thereof. The material and air can have a lower refractive index than the polymer guide. The metal can be a dielectric metal. These materials can reflect light travelling in the light path towards the user.

The presently disclosed light guiding apparatus is flexible. To this end, the polymer guide can be made from a flexible polymer. Accordingly, while this embodiments shows the light guiding apparatus 3 as a straight bar structure, it is not limited to this. In other embodiments, the light guiding apparatus 3 can be a curved structure or can be bent accordingly to conform to a surface.

The presently disclosed light guiding apparatus can also be curved. To this end, the polymer guide can be of a curved configuration. When the polymer guide is curved, there is no line of sight along the light path between the first end and the second end.

Stiffness (or rigidity) is a property of a polymers that can be described by flexural modulus or bending modulus of elasticity. Flexural modulus denotes the ability of a material to bend. It is a measure of a materials stiffness/resistance to bend when a force is applied perpendicular to the long edge of a sample—known as the three point bend test. The flexural modulus is represented by the slope of the initial straight line portion of the stress-strain curve and is calculated by dividing the change in stress by the corresponding change in strain. Hence, the ratio of stress to strain is a measure of the flexural modulus. Flexural Modulus can be measured by test methods such as ASTM D790 and ISO 178. Flexural or bending modulus of elasticity can be equivalent to the tensile modulus (Young's modulus) or compressive modulus of elasticity.

By bending the light via the light guiding apparatus 3, the installation flexibility in a space-limited apparatus can be improved.

The polymer guide can have a flexural modulus of less than about 4 GPa. This provides the light guiding apparatus with an acceptable flexibility for conforming to a morphology of a surface. For example, the surface can have a curved morphology. To this end, the light guiding apparatus can be flexible to conform to the curved morphology of the surface, or the light guiding apparatus can be curved (moulded in a mould) which can be positioned in close contact with the surface having a curved morphology.

The flexibility of the polymer guide can be characterised by a stiffness value and/or a hardness value. The stiffness can be a bending stiffness. For example, when polydimethylsiloxane (PDMS) is used, the stiffness can be from about 0.5 MPa to about 8 MPa.

The polymer guide can have a refractive index of about 1.4 to about 1.6. For example, if PDMS is used to form the polymer guide, the polymer guide can have a refractive index of about 1.4.

The refractive index (n) of a material is a dimensionless number that describes how fast light travels through the material. It is defined as $$n = \frac{c}{v}$$

where c is the speed of light in vacuum and v is the phase velocity of light in the medium. The refractive index determines how much the path of light is bent, or refracted, when entering a material.

The polymer guide can be made from a material selected from polydimethylsiloxane (PDMS), polycarbonate, polyester, acrylic such as poly(methyl methacrylate), their derivatives and combinations thereof.

The polymer guide can have a cylindrical structure, or a rectangular structure, or a polygonal structure along the light path. The polymer guide can have a circular cross section, or a squarish, rectangular or polygonal cross section. The polymer guide can have a cross sectional thickness of about 1 µm to about 10 mm.

The polymer guide can have a cross sectional breadth of about 1 µm to about 30 mm.

The end surface of the first end 31 and the second end 32 of the light guiding apparatus 3 can be a flat, sloped, convex, or concave surface. For convenient expression, the end surface of the second end 32 of the light guiding apparatus 3 is shown and is represented by a flat surface in the current embodiment, but not limited to this.

A groove can be further formed on the light path 33 of the light guiding apparatus 3. In other embodiments, a plurality of grooves can be formed on the light path 33 of the light guiding apparatus 3 and can be disposed in a parallel or in an array form. The grooves can be disposed close to both or either of the first end 31 and the second end 32. Advantageously, the grooves can be used to alter light travelling in the light path 33 as it refract or reflects through different optical structures. The shape, size of the image formed by the light can thus be adjusted and which functions to modify the image achieved by the user.

Figure 2:
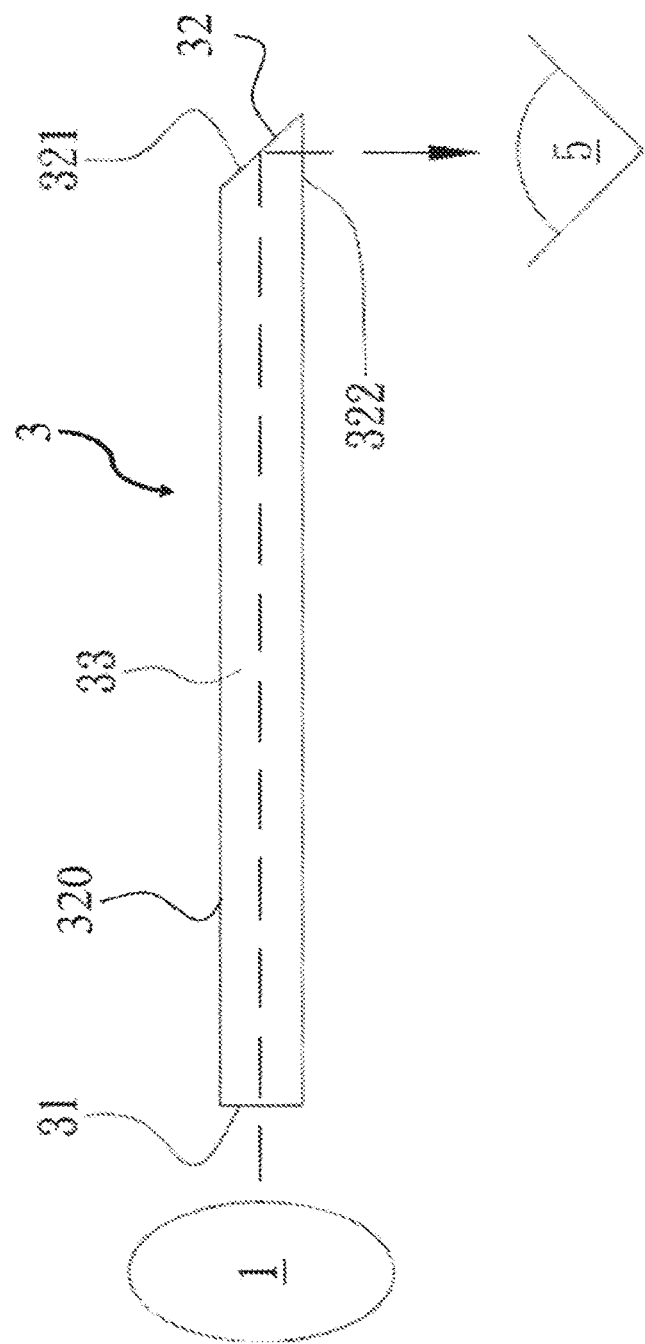
FIG. 2 is a side view of a light guiding apparatus according to another embodiment of the present invention.

The light reflector 321 is disposed within the polymer guide 320. Alternatively, the light reflector 321 can be disposed within the polymer guide 320 adjacent to the second end 32, as shown in FIG. 2. Alternatively, the light reflector 321 can be disposed within the polymer guide 320 adjacent to the first end 31. Preferably, the light reflector is interposed within the polymer guide.

As shown in FIG. 1, the light reflector 321 is positioned at an angle relative to the light path 33. This allows the light to be reflected out of the light path 33 towards a user 5. Preferentially, the light reflector is positioned or disposed such that it is not parallel to the light path, or not parallel to a longitudinal dimension or curvature of the light path. The light reflector is also positioned or disposed such that it is not perpendicular to the light path, or not perpendicular to a longitudinal dimension or curvature of the light path. For example, the light reflector can be disposed at an angle of about 5° to about 80° relative to the light path. Preferably, the angle of about 5° to about 60° relative to the light path.

For the light reflector to sufficiently be able to reflect light, the light reflector can be of a certain thickness. For example, the light reflector can have a thickness of about 3 nm to about 800 µm. In other embodiments, the light reflector has a thickness of about 3 nm to about 250 nm.

Without wanting to be bound by theory, based on Snell's law and total internal reflection ($n_{PDMS}$ sin ($Q_c$)=$n_{air}$ sin (90)), when the light enters from the polymer guide (PDMS refractive index=1.43) to light reflector (air gap structure), the light reflects due to the total internal reflection provided the angle of the air-gap structure (boundary between the PDMS and air-filled pixel) is optimised. Here, by controlling the thickness of the air-filled structures from a few microns to tens of microns, it is possible to control the reflected light intensity to make the sample transparent to the viewer. Hence the total reflection $T_F$=f(s)*f(d), in which f(s) is total internal reflection and f(d) is the depth or thickness of the air-filled structures.

At least one light reflector can be disposed within the light path. For example, a plurality of light reflectors can be positioned in parallel or in series or in an array within the light path. The plurality of light reflectors can be positioned at various angles independent of each other. This allows more light to be reflected to the user, and can thus provide for a more efficient light guiding apparatus. Further, a plurality of light reflectors advantageously allows for the light reflectors to be each smaller in size, and can improve the transparency of the light guiding apparatus as a whole. Since each light reflector can be partially reflecting, it is possible for a viewer to see through the real world and overlay with images from the micro-display. The light leakage and image distortion, especially while bending along the frame is reduced (increased sharpness) when a plurality of light reflectors are used. Here, the eyestrain is reduced due to the thin planar structure and field of view/eye box has increased due to the multiple reflector structures.

Figure 3A:
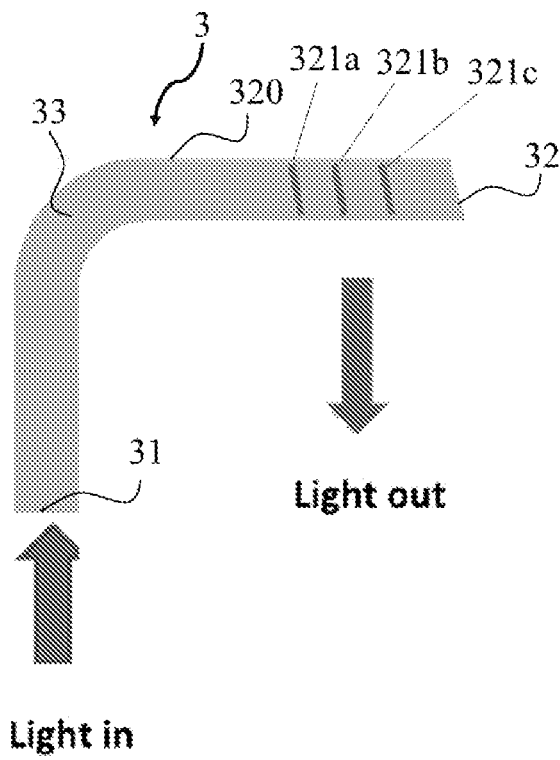
FIG. 3a-c is a side view of light guiding apparatuses having a plurality of light reflectors.

FIG. 3a shows an example of a light guiding apparatus 3 having a plurality of light reflectors 321a, 321b, 321c. In this embodiment, the light reflectors are arranged in series, such that light not reflected by a preceding light reflector (or by the array of nanostructures and/or microstructures in a preceding light reflector) is reflected by the following light reflector (or the array of nanostructures and/or microstructures in the following light reflector). The light reflector and/or each of the nanostructures and/or microstructures are made from a metal such as gold. The light guiding apparatus 3 is also shown in a non-linear configuration. As the light is internally reflected within the light path 33, the light is able to reach the light reflectors 321a, 321b, 321c when the polymer guide 320 is bent or curved.

Figures 3B, 3C:
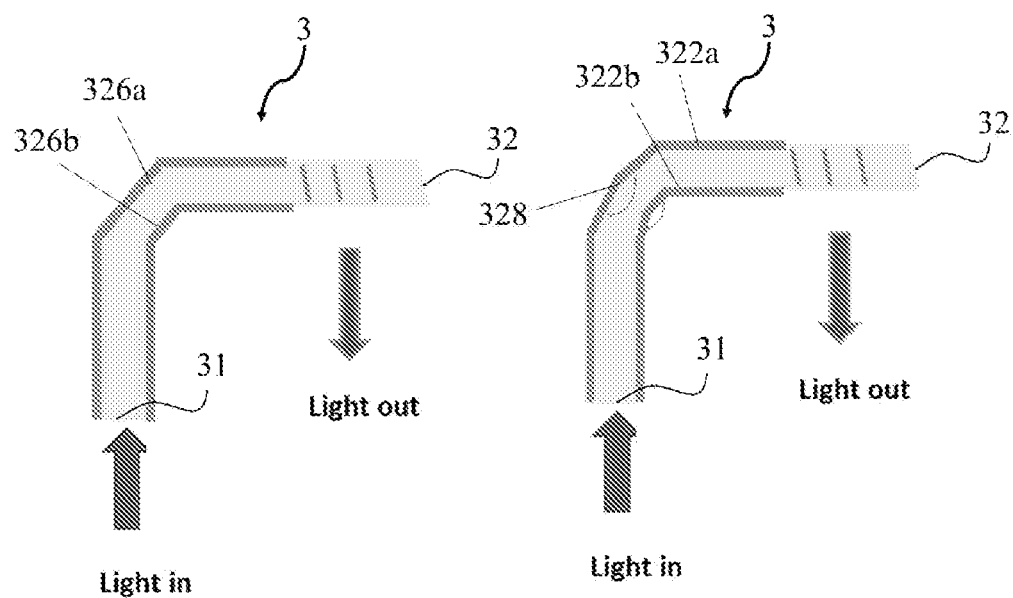

FIGS. 3b and 3c shows other embodiments of the light guiding apparatus 3. The non-linear configuration of the light guiding apparatus 3 can be of an angular configuration, for example a prism cut 326a on the outer curvature or prism cut 326a and 326b in both outer and inner curvature. Alternatively, the light guiding apparatus 3 can have multiple angles 328 as shown in FIG. 3C. The light guiding apparatus 3 can have a cladding layer deposited on one side 322a (partially covering) or both sides 322a and 322b (fully covering) of the light guiding apparatus 3. The cladding layer can be made of nanoscale metallic film or metal dielectric film or dielectric mirror.

Figure 4:
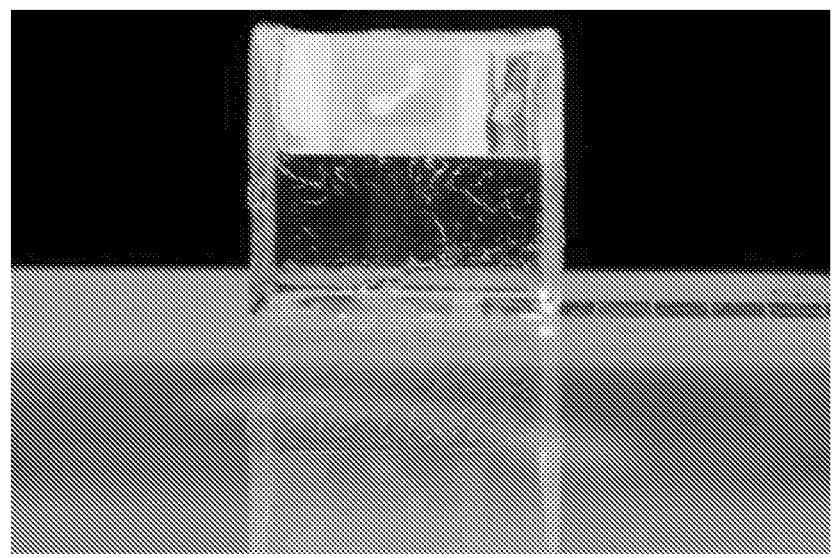
FIG. 4 shows the image formed using the light guiding apparatus of FIG. 3.

FIG. 4 shows the image formed using the light guiding apparatus of FIG. 3a.

A layer of metal such as aluminium or silver is a good reflector for light the visible spectrum. The reflectance of a metal layer can be calculated from the index of refraction n and the extinction coefficient k of the metal. The reflectance (R) of a metal surface in air is given by:

$$R\ (\%) = \frac{(n-1)^2 + k^2}{(n+1)^2 + k^2} \times 100.$$

In some embodiments, when the light reflector and/or each of the nanostructures and/or microstructures is a metal, the metal selected from gold, silver, aluminium, chromium, copper, nickel, platinum or their combination thereof.

When the light reflector and/or each of the nanostructures and/or microstructures is a metal-polymer boundary, at least one metal pixel is formed within the polymer guide. The metal can have a thickness of about 3 nm to about 80 nm. Preferably, the thickness is about 4 nm to about 60 nm. Depending on the thickness of the metal layer, the amount of light that is reflected can be varied, and at the same time the transparency of the image guiding apparatus can be varied.

A material or air having a lower refractive index than the polymer guide can be used as a light reflector. This is based on the understanding of Snell's law and total internal reflection that light in an optically denser medium can be reflected off an interface with a optically less dense medium if the angle at which the light makes with the normal of the interface is more than the critical angle. The critical angle is the angle of incident in an optically denser medium for which the angle of refraction is 90°.

Accordingly, the light reflector and/or each of the nanostructures and/or microstructures can be an air-polymer boundary or a material-polymer boundary. The material can have a refractive index of less than about 1.4. In other embodiments, the material is polytetrafluoroethylene (PTFE). Alternatively, when air is used, at least one air filled gap (air pixel, air filled nanostructure and/or microstructure) is formed within the polymer guide.

When the light reflector and/or each of the nanostructures and/or microstructures is a material having a refractive index of less than about 1.4, the material can have a thickness of about 10 nm to about 200 µm. Preferably, the thickness is about 20 nm to about 10 µm. Depending on the thickness of the material, the amount of light that is reflected can be varied, and at the same time the transparency of the image guiding apparatus can be varied.

Such nanostructures and/or microstructures can efficiently couple the light and provide an effect of focusing light towards the user 5, thus provides for a brighter and clearer image.

For example, the light reflectors 321*a*, 321*b*, 321*c* of FIG. 3 can be pixelated in the sense that the light reflectors comprises an array of structures, the structures separated from each other by a pitch. To this end, the reflection or transmission is controlled by varying the pitch of nanostructures and/or microstructures (pixels), size and thickness. This gives more degree of freedom for reflection and see through transmission.

The nanostructures and/or microstructures each independently can have a thickness of about 4 nm to about 500 µm, about 4 nm to about 300 µm, about 4 nm to about 100 µm, about 4 nm to about 50 µm, or about 4 nm to about 10 µm. The nanostructures and/or microstructures can be made of a metal and have a thickness of about 4 nm to about 50 nm. The nanostructures and/or microstructures can be made of a material of lower refractive index compared to the polymer guide and have a thickness of about 4 nm to about 20 µm.

The nanostructures and/or microstructures can each independently have a size or width of about 50 nm to about 1000 µm, about 50 nm to about 700 µm, about 50 nm to about 500 µm, about 50 nm to about 300 µm, about 50 nm to about 100 µm, about 50 nm to about 70 µm, about 50 nm to about 50 µm, or about 50 nm to about 10 µm. For example, nanostructures and/or microstructures can made of gold and have a size of about 50 µm.

The pitch between the nanostructures and/or microstructures can each independently be about 50 nm to about 500 µm, about 50 nm to about 400 µm, about 50 nm to about 300 µm, about 50 nm to about 200 µm, about 50 nm to about 100 µm, about 50 nm to about 70 µm, about 50 nm to about 50 µm, or about 50 nm to about 10 µm. For example, pitch can be about 20 µm.

The nanostructures and/or microstructures can have each independently have a different shape. For example, the shape can be square, rectangle, triangle, circular, hexagonal or polygonal. The above array of nanostructures and/or microstructures can be arranged in different configurations. For example, the array can be a square array, hexagonal array, triangular array, rectangular array. The boundaries of the array can be undefined or not straight such that a random array is arranged.

When the light reflectors comprises of nanostructures and/or microstructures (pixilation), the reflectance (R) of a metal surface in air is given by:

$$R\ (\%) = \frac{(n-1)^2 + k^2}{(n+1)^2 + k^2} \times f_{pitch} \times f_{structure\ size} \times f_{structure\ thickness} \times 100$$

wherein 'f' denotes 'function of'.

Similarly for air-filled pixels, the reflectance (T) is given by $$T(\%) = f_s \times f_{pitch} \times f_{structure\ size} \times f_{structure\ thickness} \times 100$$

Wherein $f_s$ is a function of the total internal reflection.

Accordingly, in some embodiments, the at least one light reflector is provided by a single air filled gap, an array of micro or nano-size air filled gaps or an array of metal micro or nano-sized structures. The metal can be gold or silver.

When the light reflector 321 is positioned at an angle relative to the light path 33, each of the nanostructures and/or microstructures can be independently positioned at an angle relative to the light reflector. In this sense, each of the nanostructures and/or microstructures is positioned at various angles relative to the light path. For example, when the light reflector is positioned at 45° relative to the light path, each of the nanostructures and/or microstructures can be independently positioned at an angle of 0° to about 40° offset from the plane of the light reflector. Accordingly, each nanostructures and/or microstructures can independently be about 5° to about 85° relative to the light path. Preferably, the angle is of about 5° to about 80°, or about 15° to about 60° relative to the light path.

It was found that this is further advantageous as it provides for a wider field of view to the viewer. Accordingly, the viewer's eye does not have to be positioned at a specific location to receive the output light, but can be adjusted about a 3D volume. This is particularly advantageous for applications in headgear, as it accommodates for different head sizes and a perceived depth of field by the viewer.

Further, as the array of nanostructures and microstructures allows for multiple reflections at various angles, by tuning the angles of these structures, an image at a light source can be expanded to an appropriate size for viewing by a viewer. This allows for miniaturization of other components that are used together with the light guiding apparatus.

The expansion of an image from a source to the eye can be dependent on width and thickness (depth) of the nanostructures and/or microstructures. In some embodiments, the thickness (depth) of the structures is about 5 nm to about 500 µm and the width is about 50 nm to about 500 µm.

In some embodiments, an expansion ratio (of the image at a light source to the image at an eye) is about 2 to about 100.

Further advantageously, by having an array of nanostructures and/or microstructures each independently at various angles, the light beam transmitted within the polymer guide can be scrambled. In this regard, a spectral image can be obtained (imaging that uses multiple bands across the electromagnetic spectrum). Accordingly, more information can be relayed to a viewer's eye as the image can be coloured. Further, as a more of the light beam in the polymer guide is reflected towards the eye, a better image quality can be received at the viewer's eye which is suitable for outdoor use where there is a high background noise. This is in contrast to prior waveguides which uses laser beams as a light source, which only allows for a monotonous colour, is excessively bright and has a large light loss.

The light guiding apparatus 3 can further comprise a cladding layer, or a coating 322. The cladding layer envelopes or encapsulates the polymer guide 320 and/or light path 33. The cladding layer can be in contact with the polymer guide 320 and/or light path 33. The cladding layer can comprise one or more layers of materials of lower refractive index than the polymer guide 320 and/or light path 33 which has a higher refractive index. The cladding layer is preferentially advantageous as it allows light to be confined to the polymer guide 320 and/or light path 33 by total internal reflection (instead of just internal reflection) at the boundary between the two. To this end, light propagation in the cladding layer is suppressed and light leakage can be eliminated or at least reduced.

The cladding layer or coating 322 can be applied adjacent to the second end 32. When applied as such, the coating serves to remove stray light such that a focused image is formed at the user 5. Alternatively, the coating 322 can be applied throughout a surface of the polymer guide 33. When applied as such, the coating serves to improve the internal reflection such that a brighter image is formed at the user 5.

The cladding layer can be selected from a metal, a material having a lower refractive index than the polymer guide, or a combination thereof. When the cladding layer is a metal, the metal can be selected from gold, silver, aluminium, chromium, copper, nickel, or platinum. When the cladding layer is a material having a lower refractive index than the polymer guide, the material can be selected from air, or polytetrafluoroethylene (PTFE). In some embodiments, the cladding layer comprises a dielectric material or a dielectric mirror (a dielectric stack). A dielectric mirror, also known as a Bragg mirror, is a type of mirror composed of multiple thin layers of dielectric material. Some dielectric materials, but are not limited to, are magnesium fluoride, silicon dioxide, tantalum pentoxide, zinc sulfide, and titanium dioxide.

The cladding layer can be about 50 nm to about 200 nm thick. Alternatively, it can be less than about 150 nm, about 120 nm, about 100 nm, about 80 nm, about 50 nm, about 40 nm, about 30 nm, about 20 nm or about 10 nm.

The light guiding apparatus 3 can further comprise a buffer layer. A buffer layer can be used to envelope or encapsulate the light guiding apparatus for the purpose of providing mechanical isolation, protection from physical damage and ease of identification. The buffer layer may take the form of a miniature conduit, containing but not connected to the light guiding apparatus (loose buffer). Alternatively, the buffer layer can be in intimate contact with the light guiding apparatus (tight buffer).

The buffer layer can be applied to the light guiding apparatus by methods such as spraying, dipping, extrusion and electrostatic methods. Materials used to create buffers can include fluoropolymers such as polyvinylidene fluoride (Kynar), polytetrafluoroethylene (Teflon), silicon dioxide or polyurethane.

Advantageously, as the light guiding apparatus is transparent and flexible, it can be integrated into a transparent surface and not restrict the viewing angle or view of a user.

The light guiding apparatus 3 can be disposed adjacent to a light source 1.

The light source 1 is used to project a visible light beam which is indicated by a dashed arrow. In some embodiment, the light source 1 is an organic light-emitting diode display. In other embodiments, the light source 1 is a light-emitting diode display, a micro light-emitting diode display, a MEMS controlled laser projector, a liquid crystal on silicon projector, a thin film transistor liquid crystal display, or a digital light processing projector. In some embodiments, the light source can be from a screen of a mobile phone. For example, the micro-display unit can be integrated with processors, electronics and rechargeable mini-batteries for feeding images.

Figure 3D:
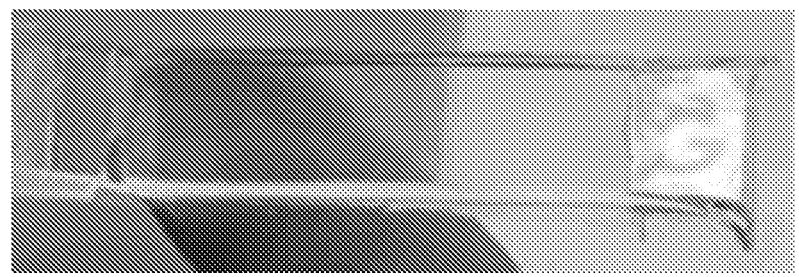
FIG. 3d is a top down view of an embodiment of the light guiding apparatus.

FIG. 3 shows an example of the light guiding apparatus 3 coupled to a light source 1. FIG. 3d shows an example of the light guiding apparatus being bent but still able to transmit light from the source to the light reflector.

The visible light beam can have a wavelength ranging from about 380 nm to about 750 nm, which can be observed by human eyes.

The visible light beam projected correspondingly by the light source 1 is received at the first end 31 and guided to an image-receiving object 5 out of the second end 32 through the light path 33 to form an image. The visible light beam projected by the light source 1 can travel in a straight path or a non-direct path (internal reflection).

Figure 5:
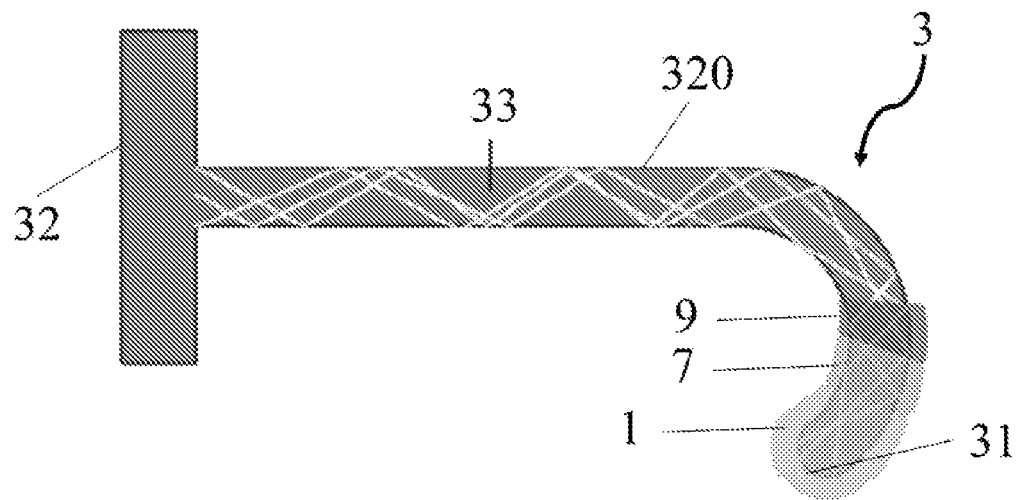
FIG. 5 is a side view of a light guiding apparatus according to another embodiment of the present invention.

FIG. 5 shows an embodiment of the light guiding apparatus 3. The light source 1 is a micro display. A Micro display is a display too small for direct viewing and can be also called "spatial light modulator". Light from the light source 1 at the first end 31 is at least internally reflected via the light path 33 towards the second end 32. The polymer guide 320 is bent at a position adjacent to the first end 31. For transmitting light and retaining information from the micro display (micro optics) to the user 5, a coupling means 7 such as a micro optics coupling technology can be included. A micro lens array 9, which contains multiple micro lenses in a square or hexagonal packing, can be further included. Such arrays can be used for homogenization, beam shaping and coupling into the light path 33.

Figure 6:
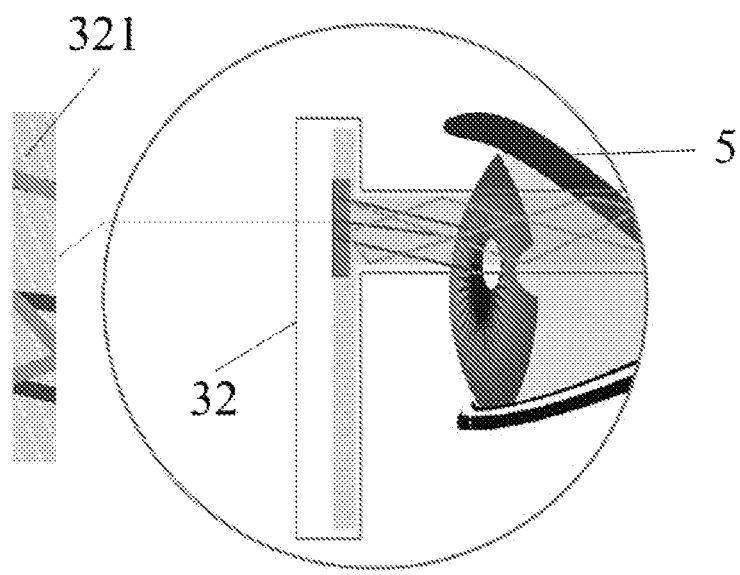
FIG. 6 shows a magnified view of the embodiment in FIG. 5 at the second end.

FIG. 6 shows a magnified view of the embodiment in FIG. 5 at the second end 32. Light reflectors 321 are incorporated proximate to the second end 32. The light reflectors 321 are air filled micro/nano structures, arranged in a fashion to efficiently couple light from different angles to a user 5.

Figure 7:
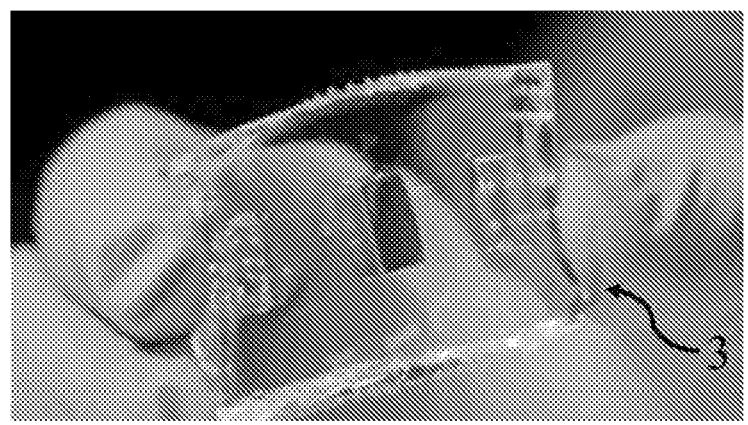
FIG. 7 shows the flexibility of the light guiding apparatus.
Figure 8:
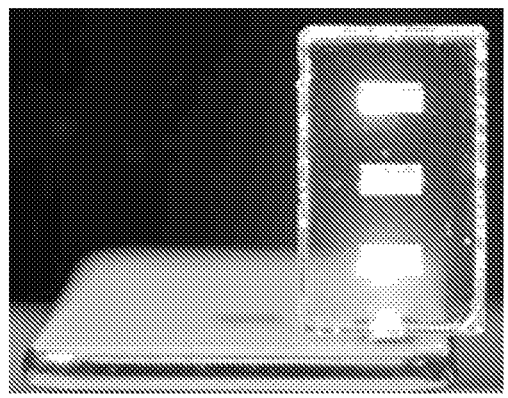
FIG. 8 shows image formed using the light guiding apparatus of FIG. 7.

FIG. 7 shows that the light guiding apparatus 3 can be flexible. FIG. 8 shows that the light guiding apparatus 3 is capable of enabling a light from a light source arriving at the image-receiving object to have high brightness.

The light guiding apparatus 3 can further comprise a lens. The lens can be a single lens or an array or lenses. The lens can be positioned within the polymer guide, or between the first end of the polymer guide and the light reflector. In this way, the image from, for example, a micro-display can be coupled into the first end of the polymer guide (waveguide) using suitable coupling optics. The images in the waveguide can undergo multiple reflection. After each reflection, the image can increase in size or will remain same size depending on the magnification of the lens or lenses. The magnified image can thus be reflected out to the user.

The light guiding apparatus can be installed as a one dimensional thin film comprising light reflectors having a line of pixels. The length and width of each reflecting pixel can be optimised to increase the light reflection efficiency. For example, with air filled pixels, the length will be kept the same as the size of one row of micro-display pixels and the width will be varied to cover 5 pixels to 25 pixels. If the micro-display has M rows and N columns, display size of 4 mm*4 mm is achievable with each display pixel size being 10 μm. Then the length of the air filled pixel will be designed to be 4 mm and will have a width of 50 μm (the air filled pixels cover 5 micro-display pixels in column and M pixels rows (4 mm)) or 1 mm (the air filled pixels cover 100 display pixels in column and M in rows (4 mm)).

FIG. 13 shows an example of a light guiding apparatus fabricated as a one dimensional film. The light guiding apparatus comprises a light reflector with 50 μm microstructures as reflecting pixels. Here, reflecting gold pixelated squares were fabricated on the top PDMS wedge shape (W) using photolithography (for making the pattern), metal deposition and lift off process. It was found that structures of a few microns can create diffraction effects. Around 50 μm size and a pitch of 20 μm gave good image quality after the reflection as shown.

By means of such a design of the present invention, the visible light beam projected by the light guiding apparatus has high brightness and consumes less light energy when arriving at the image-receiving object. Besides, the installation flexibility in a space-limited apparatus can be improved.

The light guiding apparatus 3 as disclosed herein can be formed as an array. This can be achieved by stacking or positioning a plurality of polymer guides in an array and further coupling at least a light reflector within the polymer guide at an angle to the light path.

Figure 9:
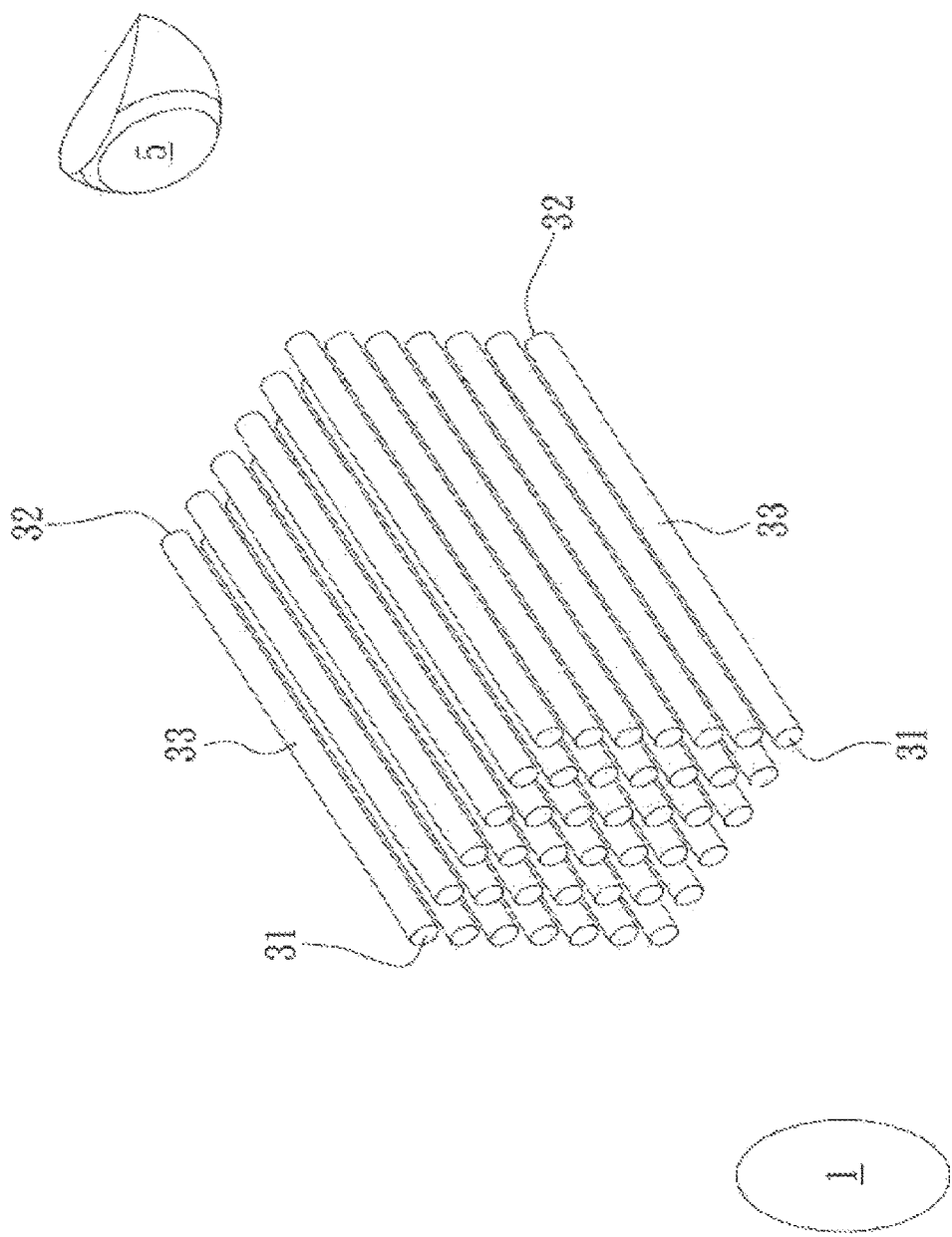
FIG. 9 is a perspective view of an array of light guiding apparatuses according to an embodiment of the present invention.

FIG. 9 is a perspective view of stacked light guiding apparatuses. The array in the current embodiment has a plurality of light guiding apparatuses which are stacked relative to one another to guide a plurality of visible light beams. The light guiding apparatuses 3 may be adhered to each other. In the current embodiment, the light guiding apparatuses 3 are disposed in parallel, but not limited to this. In other embodiments, the light guiding apparatuses 3 can be spread from the first end 31 to the second end 32, or are concentrated from the first end 31 to the second end 32.

The light guiding apparatuses 3 individually have the same or different optical structures, each of which has a cross-sectional shape, an end surface, and length, and a combination thereof. The light guiding apparatuses 3 can have the same length, but not limited to this. When the light guiding apparatuses 3 are of different lengths, all the second ends 32 of the light guiding apparatuses 3 can be designed as reflective surfaces and the lengths of the light guiding apparatuses 3 are arranged to decrease gradually from the second end 32 to the first end 31 such that the visible light beams can be reflected to a predetermined direction.

In the embodiment of FIG. 9, the light guiding apparatuses 3 are stacked to form a square array, but not limited to this. In other embodiments, the cross sections of the light guiding apparatuses 3 can form a circular array, a wavy or stepped array, any geometric array, or an irregular array.

Figure 10:
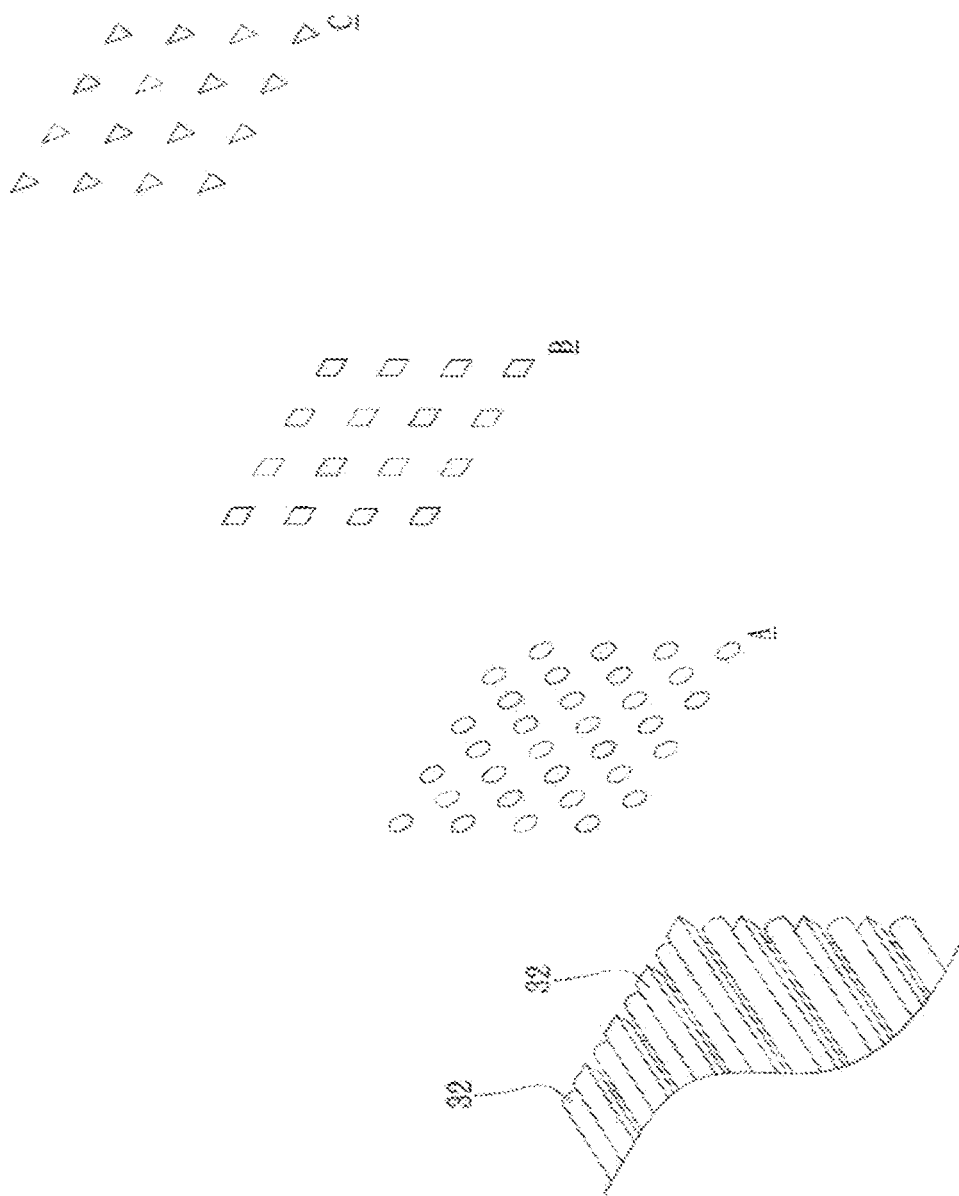
FIG. 10 is a schematic view of the imaging at different distances of the light guiding apparatus according to an embodiment of the present invention.

The light guiding apparatuses 3 having different cross-sectional shapes and/or length allows for the formation of images at different distances out of the second ends 32 (FIG. 10). For example, the visible light beams guided by the light guiding apparatuses 3 having circular cross sections from the image at a distance of A, guided by the light guiding apparatuses 3 having square cross sections from the image at a distance of B, and guided by the light guiding apparatuses 3 having triangular cross sections from the image at a distance of C. In this way, different depths of field can produce different distances of imaging focal plane.

In an embodiment, the light guiding apparatuses 3 are disposed in parallel on a supporting plate. In another embodiment, the light guiding apparatuses 3 are disposed coaxially in which the first end 31 of one light guiding apparatus 3 corresponds to the second end 32 of another light guiding apparatus 3. Therefore, the visible light beams individually pass through the same or different optical structures of the light guiding apparatuses 3 to form images at different distances out of the second ends 32.

The light guiding apparatus in the array can be each separated by a cladding layer.

The light guiding apparatus in the array can be each separated by a buffer layer. Alternatively, the light guiding apparatus in the array can be grouped into units of an appropriate number (more than one) and separated from other units by a buffer layer. For example, the light guiding apparatus can be grouped into units of 2 to about 1000, or up to about 10,000. In another embodiment, the array is contained in a loose buffer, which can also include a lubricating gel. In other embodiments, the light guiding apparatus in the array is collectively coated by a buffer layer.

In this way, thousands of micron thick light guiding apparatuses can be stacked together to form an array of about 1 mm to about 10 mm thick.

The array can further comprise a light source disposed adjacent to the first end for projecting at least one visible light beam. An optical means for coupling light from light source into the light path of the polymer guide may be needed.

Figure 11:
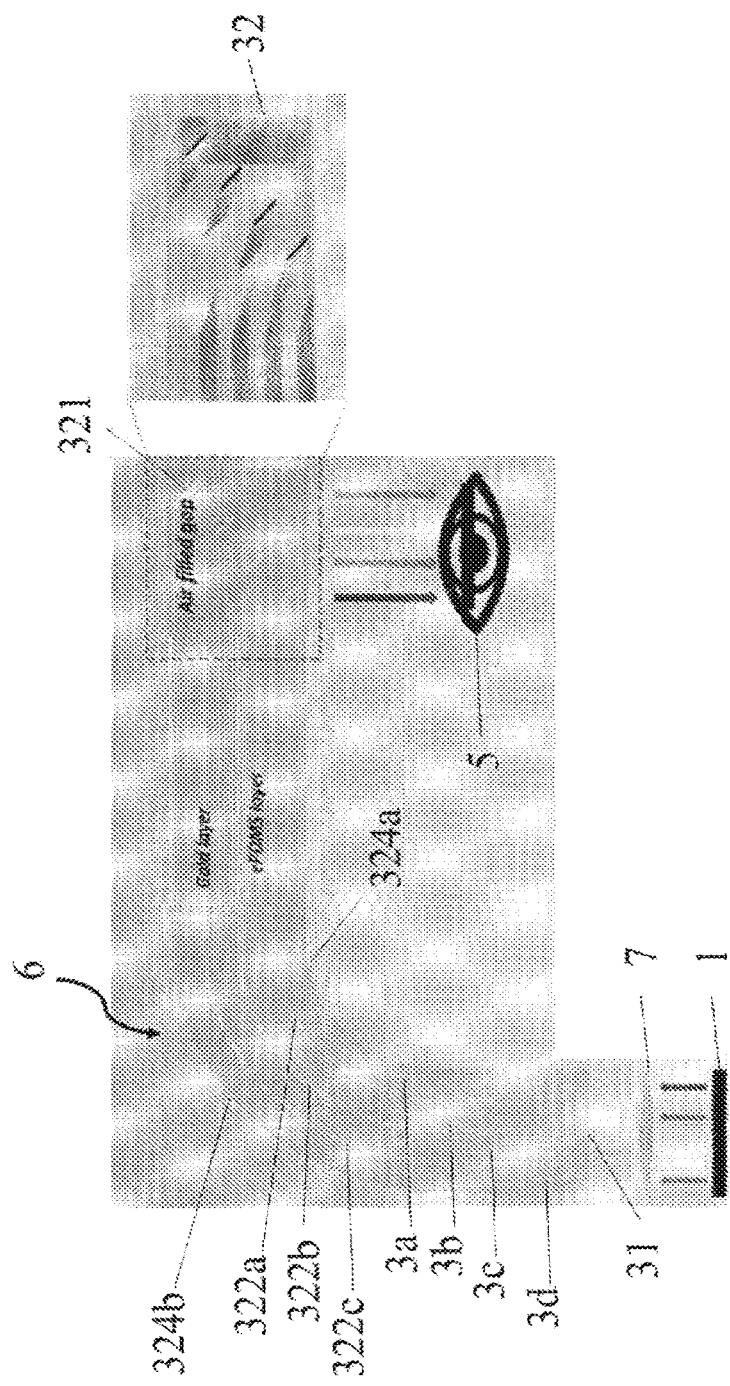
FIG. 11 shows an example of an array according to an embodiment of the present invention.

An image from an array of pixels N*M (N number of rows and M number of columns) can be formed and focused from a stack array of PDMS flexible waveguides as shown in FIG. 11. FIG. 11 shows an example of an array 6. The array 6 is made up of four light guiding apparatuses 3a, 3b, 3c, 3d. The light guiding apparatuses 3a, 3b, 3c, 3d are separated from each other by respective cladding layers 322a, 322b, 322c. The array may further be protected by buffer layers 324a, 324b. In this embodiment, the cladding layers and buffer layers are formed from gold which is about 10 nm thick. The light reflectors 321 of each light guiding apparatus are displaced from each other by a fixed distance. When light from the light source 1 passes through a coupling means 7, the light is decoupled into its respective primary colour groups (blue, red, green, yellow), each entering into a light guiding apparatus 3. The array 6 has N number of layers and hence each layer is covering a line of pixels. The thickness of the one layer is equal to width of a pixel. Hence N number of layers will cover the full pixels and hence the full image. Another possible design is that one layer can cover 2 or multiple lines of pixels instead of just one line of pixels. By positioning the light reflectors 321 at predetermined positions and angles, the light can be coupled out to form a complete image at the user 5. Advantageously, the stacking of multiple parallel air reflectors increases the field of view.

The array 6 is also shown in a non-linear configuration, when the polymer guide is bent or curved. The non-linear configuration of the array 6 can be of an angular configuration, for example a prism cut on the outer curvature or prism cut in both outer and inner curvature. Alternatively, the array 6 can have multiple angles.

FIG. 12 further exemplifies the other embodiments of the light reflectors. In A, the light reflector is a single air filled or metal structure. This single light reflector serves to reflect light, and hence the image, from the array of polymer guide to the user. The thickness of the air filled structure can be varied to tune both the reflection and transmission through. In B, the light reflector is an array of air-filled or metal nanostructure. These nanostructures form pixels from which light, and hence the image, can be reflected to the user. Here, the pixellation helps in getting more parameters for tuning the reflection and transmission. The reflection and transmission coefficients can be tuned by varying the thickness of the nanostructures and/or microstructures (pixels), pitch of the pixels and size of each pixel. In C, a top view of B showing the nanostructures (pixels) is exemplified.

The array of light guiding apparatuses can be installed as a 2D film comprising light reflectors having nanostructures (pixels). Here, each nanostructure will be pixelated with different pixel sizes. The length and width of each reflecting pixels will be varied to cover 5 pixels to 25 pixels. For example, if the micro-display has M rows and N columns, a display size of 4 mm*4 mm and each pixel size of 10 μm in length and width. Then the length and width of each reflecting pixels will be of 50 μm*50 μm (each pixel covers 5 micro-display pixels in column and 5 pixels in rows) or 250 μm*250 μm (covers 25 pixels in column and pixels in row).

The present invention also relates to a method of guiding light from a light source to a user using a light guiding apparatus as disclosed herein. The method comprises disposing the light source adjacent to the first end of the light guiding apparatus, and viewing an image at the second end of the light guiding apparatus.

The first end of the light guiding apparatus receives the at least one visible light projected the at least one light source.

A light path of the at least one light guiding apparatus guides the at least one visible light beam to an image-receiving object (or user) out of a second end of the at least one light guiding apparatus to form an image.

The present invention also relates to a method 8 of fabricating the light guiding apparatus. The method comprises a step 801 of forming a light transmitting polymer guide having a first end, a second end extending from the first end, and a light path extending between the first end and the second end, and a step 803 of disposing at least one light reflector along the light path and at an angle relative to the light path. The light reflector is selected from a metal coating, a material having a lower refractive index than the polymer guide, or a combination thereof.

As an example, 3D printed mould with prism cut coupling side can be used as a starting material. The 3D printed mould has large surface roughness due to layer by layer printing, especially on the walls. A flexible smooth plastic film is used to cover the inner side of the 3D printed mould to make the surface walls smooth. PDMS is poured and cured to make the flexible polymer guide. The polymer guide is provided with 3 prism cuts, into which 5 to 20 nm metal (gold) is deposited on one side of the cut structures. The polymer guide with prism cuts are aligned and connected together using oxygen plasma such that the deposited gold structures are embedded within the polymer guide (FIG. 3). The area not covered with gold will attach strongly due to PDMS-PDMS interactions.

For example, a gold film of around 40 nm can be deposited using metal evaporation only on the waveguide part (on one face) leaving the air-filled display part and four edges (FE) of the PDMS layer using a metallic mask. This gold spacer film will prevent light leakage from the individual waveguide film while bending.

Here, the light will be coupled out using the nanothick metal layer into eyes and same time the nanoscale gold is transparent to see the outside world.

As another example, the method above can be used for forming light reflectors that consist of air. In this embodiment, instead of depositing gold, PDMS can be etched on one side of the cut prism structures such that trenches are formed. When the polymer guide with prism cuts are aligned and connected together using oxygen plasma, the air structures are embedded within the polymer guide.

For example, the air-filled light reflectors can be fabricated using Nanoscribe Photonic Professional GT2 (GT2). The 3D nanoscribe is a 'high resolution printer' that combines the technique of 2 photon polymerisation (2PP) with a traditional 3D printing workflow used for additive manufacturing. It offers a one-step process to fabricate almost any arbitrary complex 3D shapes and objects in 3D with nanoscale resolution over a large area. It is also possible to achieve steep slopes, sharp edges, smooth surfaces, and even complex 3D designs. The nanoscribe has a resolution close to ~100 nm, over an area of 100×100 $mm^2$, maximum height of up to 10 mm and with writing speeds of up to 1 $mm^3$ in 10 seconds. A single polymer master for the air-filled reflecting pixels and waveguide can be made with registration marks on corners for alignment (for example, a single film of 500 μm thick). The engineering of PDMS can be carried out to make refractive index uniform across the film, fast curing and for making surface smooth. The engineered PDMS can be poured for curing to get the single waveguide layer embedded with the reflecting pixels. The film will then be peeled off and kept on a clean silicon wafer. This step will be repeated to build multiple layers.

The present invention also relates to a method of fabricating an array of light guiding apparatuses, comprising:
a) forming a first light transmitting polymer guide having a first end, a second end extending from the first end, and a light path extending between the first end and the second end;
b) stacking a second light transmitting polymer guide next to the first light transmitting polymer guide; and
b) disposing at least one light reflector within the first and second polymer guide at an angle relative to the light path;
wherein the light reflector is selected from a metal coating, a material having a lower refractive index than the polymer guide, or a combination thereof.

Here, layer-by-layer stacking of the polymer guide films using photonic alignment machine can be done to make the flexible waveguide AR display. The registration mark can be used for the alignment. When the individual layers are properly spaced, the machine will be able to pick and place one by one due to its automatic mode. The bonding between the layer can be done either using PDMS bonding on the four edges or using refractive index glue and glue table in the alignment machine.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Throughout this specification and the claims which follow, unless the context requires otherwise, the phrase "consisting essentially of", and variations such as "consists essentially of" will be understood to indicate that the recited element(s) is/are essential i.e. necessary elements of the invention. The phrase allows for the presence of other non-recited elements which do not materially affect the characteristics of the invention but excludes additional unspecified elements which would affect the basic and novel characteristics of the method defined.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A light guiding apparatus, comprising:
a) a flexible and/or curved light transmitting polymer guide having a light path extending between a first end and a second end; and
b) at least one light reflector disposed within the polymer guide at an angle relative to the light path;
wherein the at least one light reflector comprises an array of nanostructures and/or microstructures; and
wherein the array of nanostructures and/or microstructures is selected from a metal-polymer boundary, an air-polymer boundary, a material-polymer boundary, or a combination thereof, wherein a material of the material-polymer boundary has a lower refractive index than the polymer;

wherein the light reflector is interposed within the polymer guide such that the polymer guide is in contact with both an anterior surface and posterior surface of the light reflector.

2. The light guiding apparatus according to claim 1, wherein the light reflector is disposed at an angle of about 5° to about 80° relative to the light path.

3. The light guiding apparatus according to claim 1, wherein each of the nanostructures and/or microstructures is disposed at an angle of about 5° to about 80° relative to the light path.

4. The light guiding apparatus according to claim 1, wherein each of the nanostructures and/or microstructures independently has a thickness of about 4 nm to about 500 nm.

5. The light guiding apparatus according to claim 1, wherein each of the nanostructures and/or microstructures independently has a width of about 50 nm to about 1000 um.

6. The light guiding apparatus according to claim 1, wherein each of the nanostructures and/or microstructures independently has a pitch of about 50 nm to about 500 pin.

7. The light guiding apparatus according to claim 1, the light guiding apparatus comprises a plurality of light reflectors disposed within the polymer guide and arranged in series at an angle relative to the light path.

8. The light guiding apparatus according to claim 1, wherein the polymer guide has a refractive index of about 1.4 to about 1.6.

9. The light guiding apparatus according to claim 1, wherein the polymer guide has a transparency of more than 90%.

10. The light guiding apparatus according to claim 1, wherein the polymer guide has a flexural modulus of less than about 4 GPa.

11. The light guiding apparatus according to claim 1, wherein the polymer guide is made from a material selected from polydimethylsiloxane (PDMS), 20 polycarbonate, polyester, acrylic such as poly(methyl methacrylate), their derivatives and combinations thereof.

12. An array of light guiding apparatus according to claim 1.

13. The array of light guiding apparatus according to claim 12, wherein respective light guiding apparatus in the array are separated by a cladding layer.

14. The array of light guiding apparatus according to claim 12, wherein respective light guiding apparatus in the array are separated by a buffer layer.

15. The array of light guiding apparatus according to claim 12, wherein the light guiding apparatus in the array are collectively coated by a buffer layer.

16. The light guiding apparatus or array according to claim 1, further comprising a light source disposed adjacent to the first end or the second end of the polymer guide of the light guiding apparatus.

17. The light guiding apparatus or array according to claim 1, further comprising optical coupling means for coupling light from the light source into the polymer guide of the light guiding apparatus.

18. A method of fabricating a light guiding apparatus, comprising:
   a) forming a light transmitting polymer guide having a light path extending between a first end and a second end; and
   b) disposing at least one light reflector within the polymer guide at an angle relative to the light path;
   wherein the at least one light reflector comprises an array of nanostructures and/or microstructures; and
   wherein the array of nanostructures and/or microstructures is selected from a metal-polymer boundary, an air-polymer boundary, a material-polymer boundary or a combination thereof, wherein a material of the material-polymer boundary has a lower refractive index than the polymer;
   wherein the light reflector is interposed within the polymer guide such that the polymer guide is in contact with both an anterior surface and posterior surface of the light reflector.

19. A method of fabricating an array of light guiding apparatuses, comprising:
   a) forming a first flexible and/or curved light transmitting polymer guide having a light path extending between a first end and a second end;
   b) stacking a second flexible and/or curved light transmitting polymer guide next to the first light transmitting polymer guide; and
   c) disposing at least one light reflector within the first and second polymer guide at an angle relative to the light path;
   wherein the at least one light reflector comprises an array of nanostructures and/or microstructures; and
   wherein the array of nanostructures and/or microstructures is selected from a metal-polymer boundary, an air-polymer boundary, a material-polymer boundary or a combination thereof, wherein a material of the material-polymer boundary has having a lower refractive index than the polymer;
   wherein the light reflector is interposed within the polymer guide such that the polymer guide is in contact with both an anterior surface and posterior surface of the light reflector.

* * * * *